(12) United States Patent
Vitikka

(10) Patent No.: US 7,516,222 B2
(45) Date of Patent: Apr. 7, 2009

(54) METHOD FOR CARRYING OUT LOG-IN IN A COMMUNICATION SYSTEM

(75) Inventor: Ilpo Vitikka, Helsinki (FI)

(73) Assignee: Sonera Oyj, Helsinki (FI)

( * ) Notice: Subject to any disclaimer, the term of this patent is extended or adjusted under 35 U.S.C. 154(b) by 678 days.

(21) Appl. No.: 10/250,609

(22) PCT Filed: Jan. 24, 2002

(86) PCT No.: PCT/FI02/00056

§ 371 (c)(1), (2), (4) Date: Jul. 7, 2003

(87) PCT Pub. No.: WO02/059780

PCT Pub. Date: Aug. 1, 2002

(65) Prior Publication Data

US 2004/0052244 A1    Mar. 18, 2004

(30) Foreign Application Priority Data

Jan. 24, 2001   (FI) .................................. 20010148

(51) Int. Cl.
   *G06F 15/16* (2006.01)
(52) U.S. Cl. .................. 709/227; 709/217; 709/219; 709/228; 709/229
(58) Field of Classification Search .............. 709/217, 709/219, 227, 228, 229
   See application file for complete search history.

(56) References Cited

U.S. PATENT DOCUMENTS

| | | | | |
|---|---|---|---|---|
| 5,793,972 A | * | 8/1998 | Shane | 709/219 |
| 6,029,245 A | * | 2/2000 | Scanlan | 726/4 |
| 6,360,265 B1 | * | 3/2002 | Falck et al. | 709/227 |
| 6,433,794 B1 | * | 8/2002 | Beadle et al. | 715/700 |
| 6,791,974 B1 | * | 9/2004 | Greenberg | 370/352 |
| 6,804,704 B1 | * | 10/2004 | Bates et al. | 709/217 |
| 7,031,964 B1 | * | 4/2006 | King et al. | 707/10 |
| 7,082,538 B2 | * | 7/2006 | Bouchard et al. | 713/181 |
| 7,162,649 B1 | * | 1/2007 | Ide et al. | 709/223 |
| 7,171,473 B1 | * | 1/2007 | Eftis et al. | 709/227 |
| 2001/0046229 A1 | | 11/2001 | Clear et al. | |
| 2002/0078453 A1 | * | 6/2002 | Kuo | 725/46 |

FOREIGN PATENT DOCUMENTS

| | | |
|---|---|---|
| EP | 1 061 693 A2 | 12/2000 |
| JP | 10260821 A | 9/1998 |
| WO | WO 99/39281 | 8/1999 |
| WO | WO 00/48110 | 8/2000 |
| WO | WO 00/62206 | 10/2000 |
| WO | WO 02/13459 A2 | 4/2002 |

* cited by examiner

*Primary Examiner*—Liangche A Wang
(74) *Attorney, Agent, or Firm*—Cohen Pontani Lieberman & Pavane LLP

(57) ABSTRACT

The present invention relates to a method for carrying out log in in a communication system. A data transmission connection is established between a terminal and a data network via a connection server connected to the data network, wherein information can be loaded to the terminal from data storage locations connected to the data network by means of an address identifying the storage location. Information on the address of the storage location used in the beginning of the connection is stored in connection with the connection server used for logging into the data network, wherein when the data transmission connection is set up, said address of the storage location stored in connection with the connection server is selected as a start address for the terminal.

12 Claims, 2 Drawing Sheets

METHOD FOR CARRYING OUT LOG-IN IN A COMMUNICATION SYSTEM

PRIORITY CLAIM

Figure 1:
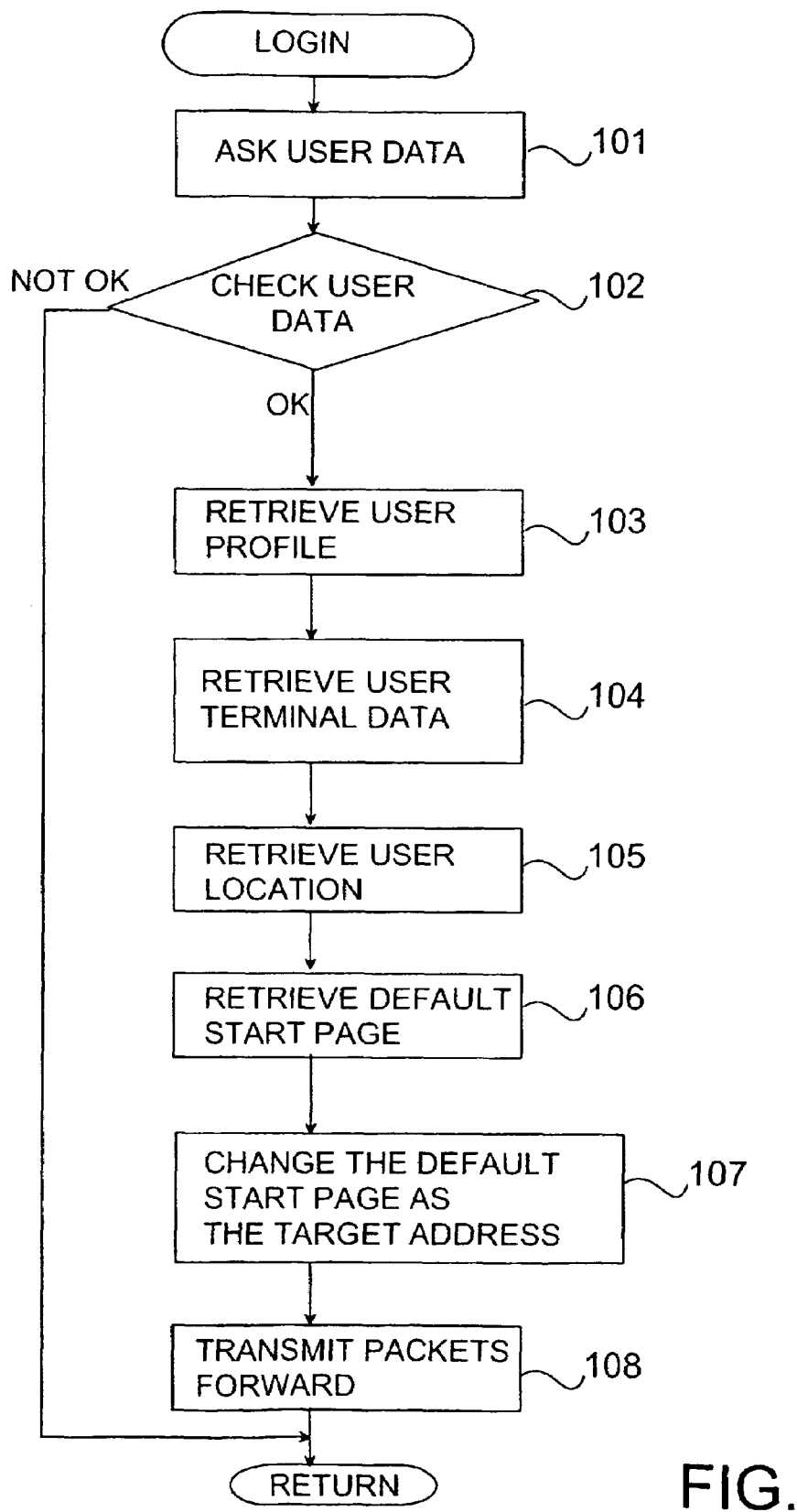

This is a U.S. national stage of application No. PCT/F102/00056, filed on 24 Jan. 2002. Priority is claimed on that application and on the following application: Country: Finland, Application No.: 20010148, Filed: 24 Jan. 2001.

FIELD OF THE INVENTION

The present invention relates to a method for carrying out log in in a communication system in which a data transmission connection is established between a terminal and a communication system via a connection server connected to a data network, and information can be loaded to the terminal from data storage locations connected to the data network by means of an address identifying the storage location. The invention also relates to a communication system that comprises at least one data network, a terminal, means for establishing a data transmission connection between the terminal and the data network, at least one connection server comprising means for logging the terminal in the data network, data storage locations have been arranged in the data network for which an identifying address is determined, which data network contains means for loading information to the terminal from said data storage locations by means of an address identifying the storage location.

BACKGROUND OF THE INVENTION

The Internet data network is a global data transmission network that comprises for example routers, nodes and servers. The Internet data network can also be divided into sub-networks (operation areas) that can be further divided into subnetworks. In the Internet data network information is transmitted in packets, the transfer of which is controlled for example by means of routers. The devices connected to the Internet data network have an individual address of their own, wherein this address information can be used in the transfer of packets from the source address to the target address. The address is composed of a series of numbers consisting of four parts, the different parts being separated from each other by means of dots, in other words the system is a so-called dot notation system. The terminals connected to the Internet data network must also have identifying addresses of their own. Such an address may either be a permanent address, wherein the same address is always used in said terminal, or a dynamic address, wherein the address of the terminal is selected from a set group of addresses (address space) in the beginning of the connection. It is difficult to remember and use such series of numbers, wherein to facilitate the handling of the addresses, the Internet data network is provided with the possibility to use an alphanumeric address to identify the terminals, servers, files in the servers, home pages etc. that are connected to the Internet data network. Such an alphanumeric address can be called an alias address. Thus, to determine the numerical address corresponding to this alias address, the Internet data network is provided with domain name servers containing a database to which the numeric address corresponding to the alias address has been stored. Thus, the system takes care of the necessary changes in the addresses and it is not necessary for the user of the terminal to remember anything else but the alias address.

The logging in to the Internet data network is typically conducted in such a manner that the user activates a browser program (Web browser) or the like. This browser program activates a connection set-up to a connection server connected to the Internet data network. This connection server is set for example at that stage when the user has made a contract with an Internet service provider for an Internet subscriber connection. If necessary, the browser program directs a modem connected to the terminal to start the call set-up to a determined phone number, if an optional telecommunication network is used as the connection mode. It is obvious that the terminal can be connected to communicate with the Internet data network in other ways as well. One such alternative way for logging in is the local area network of a company, the server of which is further connected to the Internet data network. After the necessary data transmission connection has been set up, the browser program transmits packets to the connection server, by means of which packets the aim is to set up a connection to a specific storage location in the Internet data network, i.e. to a so-called default start page of the user. Such a storage location is generally also called as a home page or www-page (World Wide Web Page). This default start page is a predetermined address, determined by the user or the browser program as an address to be selected in the beginning of an Internet connection. This default start page can be, for example, the home page of the Internet service provider itself, possible home page of the user, the home page of the employer of the user, or a corresponding page, which is known as such. After the connection has been set up to the determined home page, the transmission of packets begins from the server of the Internet data network in which this home page is located. These packets are transmitted to the terminal via packet transmission mechanisms of the Internet data network known as such, in which terminal a browser program interprets the information contained in the packets and represents it in the user interface of the terminals, for example as visual information on a display of the terminal, as an audio signal in a speaker, etc.

The aforementioned default start page can be changed into another one, whereafter in the start-up of the browser program the aim is to load this selected home page. This default start page can be set so that it is user-specific, wherein the same home page is loaded for the user, irrespective of the location in which the user uses the Internet terminal. This default start page can also be device-specific, wherein a determined home page is loaded in a set terminal, irrespective of the user that is using the browser program at a given time in said terminal. In such an arrangement the service provider does not know the default start page of each user/terminal, wherein the service provider cannot, for example, transmit information to the user via this default start page.

At present, there are known portable terminals by means of which it is possible to set up a connection to the Internet data network in a wireless manner. Thus, the user can utilize the same wireless terminal to communicate with the Internet data network in different locations: while travelling, at work, on a holiday, etc. The loading of the default start page can thus in some situations require a longer period of time, especially if the user is staying in such a country from which the connections to the server of the default start page are poor. On the other hand, the user of the terminal can, for example while travelling, wish to look for information on the destination country and/or city. Thus, it may be difficult and time-consuming to find a server suitable for retrieval of information from the Internet data network by means of the wireless terminal, because the user does not necessarily know where to begin the search. Such a problem has not been significant earlier, because the browsing of the Internet data network is primarily conducted from a fixed working station, using a fixed network.

It is an aim of the present invention to provide a method and a system for logging in to the Internet network in such a manner that the properties such as location, profile and/or terminal of the user, valid at a given time, are taken into account in the log in. The invention is based on the idea, that a default start page is set up in the log in on the basis of the properties of the user, that are valid at a given time, for example by loading the page from a predetermined storage location or by creating it dynamically on the basis of the properties of the user. To put it more precisely, the method according to the present invention is primarily characterized in that information on the address of the storage location used in the beginning of the connection is stored in connection with the connection server used for logging in to the data network, wherein one address of the storage location stored in connection with the connection server is selected as a start address for the terminal when the data transmission connection is set up. The communication system according to the present invention is primarily characterized in that information on the address of the storage location used in the beginning of the connection is stored in connection with the connection server used for logging in to the data network, and that the communication system comprises means for selecting said address of the storage location stored in connection with said connection server as a start address for the terminal when setting up the data transmission connection.

The present invention shows remarkable advantages over solutions of prior art. When the method according to the invention is applied, a local service provider can obtain a channel directed to the users of the Internet data network moving in a predetermined area for transmission of different information to the users. Furthermore, the service provider knows which page the users have as a start page and can arrange links on this page to desired locations wherein it is more likely that the users also acquaint themselves with these link pages in comparison to a prior art situation in which a start page determined by the users themselves is used. The arrangement according to the invention is also advantageous for the user of the Internet data network, because it is possible for the user to obtain information on a specific unfamiliar place while travelling therein. Another advantage is that it is possible to create special start pages for users of different terminals, so that the outer appearance of the pages would be as optimal as possible for each terminal. Another advantage is that the start page can be personalized according to the profile of the user. It is for example possible to select the native language of the user as the language of the start page, and the colour palette of the pages can be selected according to the wishes of the user.

LIST OF DRAWINGS

Figure 2:
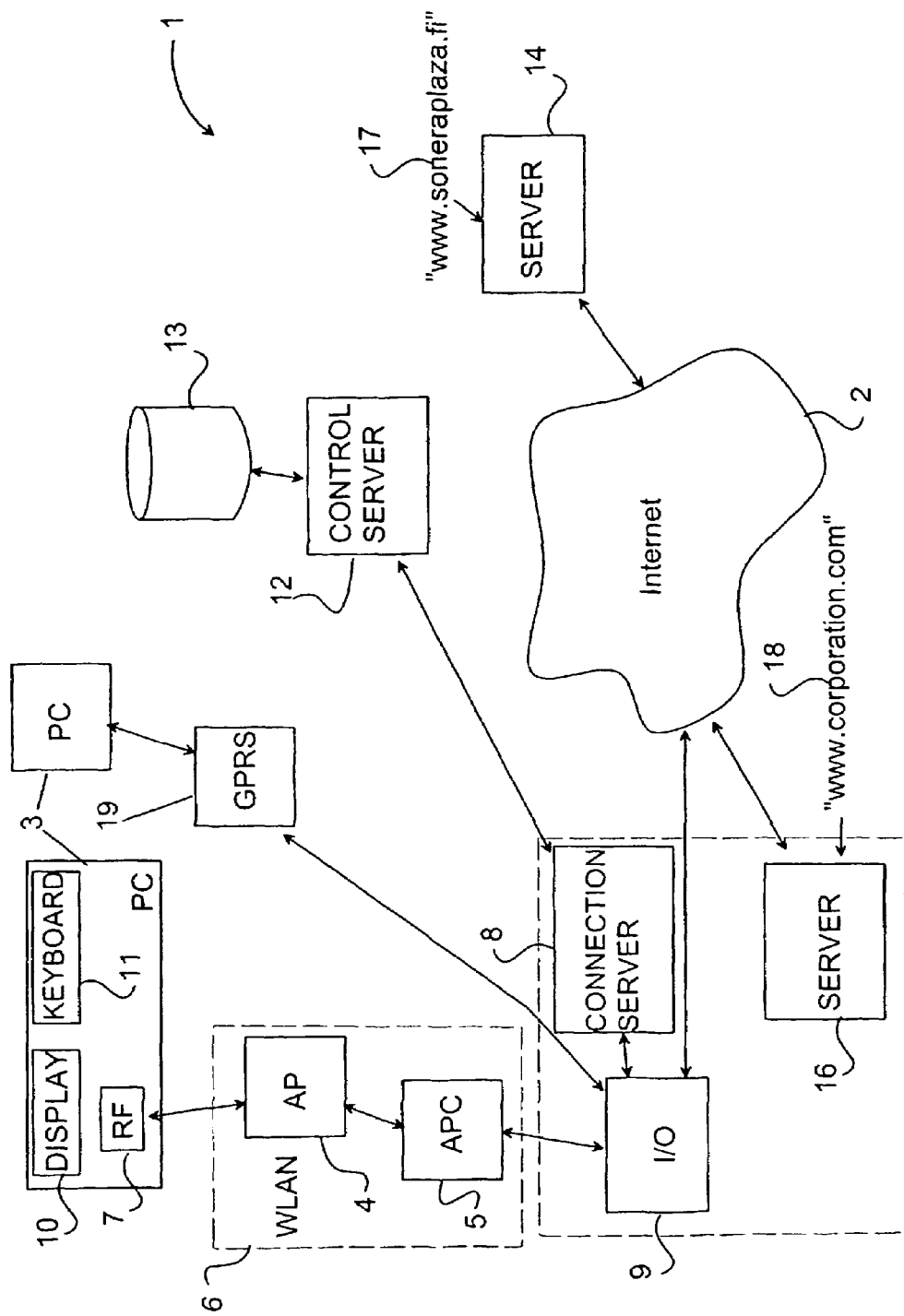

In the following, the present invention will be described in more detail, with reference to the appended drawings, in which FIG. 1 shows the method according to a preferred embodiment of the invention in a reduced flow chart, and FIG. 2 shows the communication system according to a preferred embodiment of the invention in a reduced block chart.

DETAILED DESCRIPTION OF THE INVENTION

In the following, the method according to a preferred embodiment of the invention will be described with reference to the reduced flow chart shown in FIG. 1 and to the communication system 1 according to a preferred embodiment of the invention shown in FIG. 2. In this example, the Internet data network 2 is used as a communication system 1, to which data network the user can set up a connection by means of a terminal 3 via an access point 4. The access point 4 is for example an access point or the like of a wireless local area network 6, but it is obvious that other access points can also be used while applying the invention. The access point 4 is connected to an access point controller 5 that can control several access points 4. From the access point controller 5 a data transmission connection is arranged to the connection server 8, by means of which for example the necessary input data, such as user identification and password is verified when the user logs in. The user identification and possible other user-specific information can be stored for example in a database 13 or the like arranged for example in connection with a control server 12. Thus, in connection with the log in the connection server 8 can communicate with said control server 12 to determine the log in information, if necessary. In connection with the connection server 8 an interface 9 is advantageously arranged, via which all the communication between the wireless local area network 6 and the Internet data network 2 takes place.

To log in to the Internet data network, the user activates a browser application in the terminal 3, by means of which application it is possible to examine the information contained in the Internet data network 2. If the terminal 3 does not have an active data transmission connection to the Internet data network 2 when the browser application is activated, the data transmission connection is set up. This can be conducted in a manner known as such, for example, so that the radio modem 7 of the terminal is used for informing the access point 4 of the wireless local area network 6 that a data transmission connection from the terminal 3 to the Internet data network 2 is desired. Thereafter the local area network 6 and the terminal 3 start the exchange of information via the radio modem 7 and the access point 4 to set up a connection. The connection server 8 transmits the log-in page or the like used for entering the information necessary for logging in to the terminal, said page being formed by the browser program on the display 10 of the terminal. Thereafter the user gives the necessary information for example by means of the keyboard 11 of the terminal. This is illustrated by block 101 in the reduced flow diagram of FIG. 1. This information is transmitted to the access point 4 in which the validity of the data is checked (block 102) in a manner known as such. If the user gave the information correctly, the user is logged in to the Internet data network 2 and can start browsing the information. At this stage the browser application transmits at least one packet whose target address field contains information on the address 17 of the default start page set in the browser application. This address is transmitted to the connection server 8. The address 17 is for example "www.soneraplaza.fi", the storage location of which is illustrated as a server 14 in the appended FIG. 2. Thus, in systems of prior art, the aim would be to load a page according to this address 17 to the terminal 3. In the method according to the present invention, the connection server 8 does not take into account this address 17 of the default start page, but changes it into such an address 18 that is selected by the service provider 15 of the wireless local area network 6 as a default start page (blocks 103 to 107). At this stage, the service provider knows the properties related to the user, such as the name, profile, default language and location, as well as information relating to the properties of the terminal. Thus, the service provider can use the properties of the user that are valid at a given time, such as a profile, terminal and/or location to select or create the default start page. It is, of course, obvious that other properties relating to the user can also be used in the formulation of the default start page. It is also obvious that the properties of the terminal of the user can be stored in the profile of the user. It is also possible that the information on the profile of the user can be stored in the terminal as well. For example the default language can be stored in the terminal, wherein this default language information stored in the terminal can be used when selecting the language of the start page.

By means of the method according to the invention it is thus possible to set up a sort of a directed data channel via which it is possible to transmit desired information, such as information on the services provided by the service provider, advertisements, timetable services, etc. This directed information may vary for different users, user profiles, terminals, etc.

One non-restrictive example situation in which the method according to the invention can be applied is travelling. For example if a German passenger logs in to a service provider network at Helsinki-Vantaa airport by means of his/her PDA device (Personal Digital Assistant) comprising a black-and-white display, the service provider sets up a German page intended to be presented at the Helsinki-Vantaa airport as a default start page optimized for terminals containing a relatively small black-and-white display. Furthermore, at least part of the contents of the page can be selected by means of information other than language that can be found in the profile of the user.

In the default star page it is also possible to present other information than the information of said service provider 15. The service provider can provide other service providers with the possibility to attach information of their own to such a default start page. For example, a service provider of the Internet data network 2 supplements the default start page with a link to its service, from which link the user can easily move on to browse this service. In a preferred embodiment of the invention it is also possible to provide the user with the possibility to edit a part of the default start page. Thus, the definitions made by the user are stored in the server of the service provider in question, advantageously in the profile information of the user, from which it can be loaded at a later stage as well, when the default start page of the service provider in question is formed in the terminal of the user.

As an example, in FIG. 2 the server of the service provider 15 indicated by the default start page is marked with the reference numeral 16, and the default start page stored in the server is marked with the address "www.corporation.com". Thus, the information of this default start page is loaded to the terminal 3 (block 108), whereafter the page set by this service provider is shown to the user in the terminal 3. On this page the service provider 15 can thus try to show desired information, such as information on a place or a company, advertisements, etc., optimized according to the properties of the user at a given time. After this default page has been loaded, the system functions in the manner according to prior art, wherein the user can browse the information contained in the Internet data network by moving to other pages for example via links determined on the default start page, by writing the address of the desired page, or by selecting pages stored in the browser application, i.e. so-called bookmarks.

The user can also log in to the Internet data network wirelessly for example via a mobile communication network. One example of such a mobile communication network is the GPRS network (General Packet Radio Service) 19, in which packet communication is possible. It is also possible to use a conventional circuit switched connection of the GSM mobile communication network to connect the terminal 3 to the Internet data network 2.

The connection server 8 of the Internet data network that applies the method according to the present invention functions in the following way. The interface 9 of the connection server 8 monitors all the communication flowing therethrough (TCP/IP packets). The web servers monitor (listen) the traffic of gate No. 80 by default. When the interface 9 detects packets intended for a predetermined gate (gate 80), the interface 9 guides these packets to the connection server 8. Thereafter the connection server 8 transmits the information of the log-in page to the terminal 3, wherein the user can give log-in information as presented above. After the log in has been finished, the interface changes for example the address of the default start page stored in the interface 9 in the packets that have come from the terminal. This results in that the packets transmitted from the terminal are directed to this address according to the default start page instead of the original target address. In this address the server or the like transmits the contents of said page advantageously in packets according to the IP protocol which are transmitted to the interface 9 by means of the transmission mechanisms of the Internet data network and further to the terminal 3 via the wireless local area network 6. Now the received packets are transmitted to a browser application, wherein the information received with the packets can be presented in the terminal 3, for example on the display 10. Thereafter the addresses are not changed in the interface 9 during the same connection. In a situation where a new connection is set up, the aforementioned measures are taken again to change the start page into the default start page.

The present invention can be applied in a large number of different contexts. For example a service provider of a regional local area network can determine a desired default start page for all users using said local area network, wherein the service provider can thus inform the users of the services provided. For example at airports, railway stations or bus stations it is possible to apply the method according to the invention, wherein it is possible to transmit information on timetables, tour operators, etc. to the users of the local area network 6. The invention can also be applied in stores and other companies in which the company has established a local area network at its premises. Thus it is possible to provide the user with information on the products provided by the company, special offers, locations of different products, etc.

It is obvious that the present invention is not limited solely to the above-presented embodiments, but it can be modified freely within the scope of the appended claims.

The invention claimed is:

1. A method for carrying out log in in a communication system, the method comprising:
establishing a data transmission connection between a terminal and a data network via a connection server connected to the data network by transmitting at least one packet from the terminal to the data network, said connection server including a first address indicative of a first storage location of a first start page selected by a service provider for display when logging in to a computer system;
defining in the terminal a second address indicative of a second storage location of a second start page;
supplementing the at least one packet with the second address, as well as with a gate number indicating the type of information contained in the at least one packet;

transmitting, during the established data transmission connection, said second address from the terminal to the connection server;

examining in the data network said gate information from the at least one packet coming from the terminal; and if the examination indicates that one of the at least one packet contains a predetermined value as the gate information, changing the second address contained in said packet into said first address, and thereby cause the loading to the terminal of information contained in said first data storage location when said second address is transmitted from the terminal for the first time during the established data transmission connection, replacing said second address with said first address; and loading information to the terminal from the one of said first and second storage locations indicated by the one of said first and second addresses actually utilized by the connection server.

2. The method according to claim 1, wherein said first storage location is a home page established in the Internet data network.

3. The method according to claim 2, wherein said service provider is an Internet service provider, said connection server is maintained by said Internet service provider, and said home page is the home page of said service provider.

4. The method according to any one of claims 1, 2 or 3, further comprising establishing the data transmission connection between the terminal and the data network at least partly through a wireless connection.

5. The method according to claim 1, wherein said at least one packet is formatted according to the Internet protocol.

6. The method according to any one of claims 1, 2 or 3, further comprising using in the selection of said first storage location at least one of the following properties:
 a profile of the user of the terminal,
 properties of the terminal, and
 a location of the terminal.

7. The method according to claim 6, further comprising dynamically creating information in connection with start up information in said first storage location used in the beginning of the data transmission connection on the basis of said at least one property.

8. A communication system comprising:
 at least one data network;
 a terminal including:
  means for defining a first address indicative of a first storage location, said first storage location identifying a first set of information; and
  means for transmitting at least one packet to establish the data transmission connection;
  means for establishing a data transmission connection between the terminal and the data network: and
 at least one connection server containing:
  means for logging the terminal in to the data network,
  a second address indicative of a second storage location selected by a service provider, said second storage location identifying a second set of information;
 wherein said terminal further includes
  means for adding to said at least one packet
   the second address and
   a gate number indicating a type of information contained in said at least one packet;
 wherein said connection server further includes:
  means for examining said gate number,
  means for comparing said gate number with a predetermined value, and
  means for changing the second address into said first address, if the comparison shows that the gate number matches said predetermined value;
 the data network having means for loading desired information from one of said first and second set of information to the terminal from one of said first and second data storage locations by identifying the one of said first and second storage locations from which said desired information is to be loaded; and
  means for selecting said first data storage location as the data storage location from which said desired information is to be loaded unless said first address is being transmitted for the first time during the same data transmission connection, in which case said second data storage location is selected as the data storage location from which said desired information is to be transmitted.

9. The communication system according to claim 8, wherein said second data storage location is a home page established in the Internet data network.

10. The communication system according to claim 9, wherein said service provider is an Internet service provider, said connection server is maintained by said Internet service provider, and said home page is the home page of said Internet service provider.

11. The communication system according to any one of claims 8, 9 or 10, wherein said data transmission connection between the terminal and the data network is at least partly established by a wireless connection.

12. The communication system according to claim 8, wherein said at least one packet is established according to the Internet protocol.

* * * * *